United States Patent Office 3,479,357
Patented Nov. 18, 1969

3,479,357
(6 - PHENYLPYRIMIDINE)MONO/BIS[1H - 1,2,3-TRIAZOLE-4,5-DICARBOXYLIC ACID] LOWER ALKYL ESTERS
Hans A. Wagner, Skokie, Ill., assignor to G. D. Searle & Co., Chicago, Ill., a corporation of Delaware
No Drawing. Filed Oct. 20, 1967, Ser. No. 676,737
Int. Cl. C07d 55/08, 57/18
U.S. Cl. 260—256.4                                   12 Claims

ABSTRACT OF THE DISCLOSURE

Preparation of the captioned compounds such as dimethyl 1 - (4 - azido - 5 - methyl - 6 - phenyl - 2 - pyrimidinyl) - 1H - 1,2,3 - triazole - 4,5 - dicarboxylate and tetramethyl 1,1' - (5 - methyl - 6 - phenyl - 2,4 - pyrimidinediyl)[1H - 1,2,3 - triazole - 4,5 - dicarboxylate], plus their valuable pharmacological properties, including antiulcerogenic and anti-inflammatory activity, are disclosed.

---

This invention relates to (6 - phenylpyrimidine)mono bis[1H - 1,2,3 - triazole - 4,5 - dicarboxylic acid] alkyl esters and processes for the preparation thereof. More particularly, this invention provides new, useful, and unobvious chemical compounds of the formula

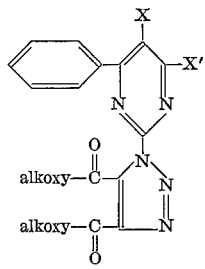

wherein X represents an alkyl, alkoxyalkyl, alkenyl, or alkynyl radical or a halogen and X' represents an azido, amino, or 4,5 - bis(alkoxycarbonyl) - 1H - 1,2,3 - triazol - 1 - yl radical.

Among the alkyl radicals contemplated by X, lower alkyl groupings are preferred, i.e., methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings of empirical formula

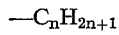
—$C_nH_{2n+1}$ wherein $n$ represents a positive integer amounting to less than 8. The alkoxyalkyl radicals contemplated by X are likewise advantageously of lower order and, accordingly, can be enformulated thus

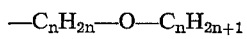
—$C_nH_{2n}$—O—$C_nH_{2n+1}$ wherein $n$ is defined as before. Similarly, lower alkenyl and lower alkynyl radicals are especially desirable embodiments of X. The latter groupings can be thought of as derived from polycarbon lower alkyl radicals by displacement of hydrogen to give rise to double and triple bonds, respectively. Illustrative lower alkenyl radicals are vinyl, allyl, propenyl, isopropenyl, 2-methylallyl, 1-butenyl, 2-butenyl, 3-butenyl, etc., among which allyl and 2-methylallyl are especially preferred. Illustrative lower alkynyl radicals are ethynyl, 1-propynyl, 2-propynyl, 1-butynyl, 2-butynyl, 3-butynyl, etc., among which the propynyl and butynyl groupings are especially preferred. When X represents a halogen, bromine is the embodiment of choice, albeit fluorine, chlorine, and iodine are also within the ambit of the instant invention.

Those skilled in the art will recognize that the 4,5-bis(alkoxycarbonyl) - 1H - 1,2,3 - triazol - 1 - yl radical contemplated by X' is the same grouping shown in the introductory formula hereof attached to the 2-position of the pyrimidine ring. The alkoxy constituents of this grouping, like the alkoxy radicals embraced by X, are desirably but not necessarily exclusively of lower order. As will appear below, both mono and bis triazolyl products eventuate from a single preparative procedure and, interestingly, manifest identical utility.

The compounds to which this invention relates are useful by reason of their valuable pharmacological properties. Thus, for example, they are anti-ulcerogenic and anti-inflammatory.

The anti-ulcerogenic activity of the instant compounds is evident from the results of a standardized test for their capacity to inhibit the ulceration reported by Shay et al., Gastroenterology, 5, 43 (1945), to occur in rats subjected to fasting and pyloric ligation. In this test, male Charles River rats weighing 200–250 gm. and fasted 72 hr. prior to ligation are used. Immediately following ligation, the prescribed dose of compound, dissolved or suspended in 1.0 ml. of pH 2.0 hydrochloric acid, is intragastrically administered to each of a group of 6 animals. A like group of animals to which is identically and concurrently administered the acid alone serves as controls. Precisely 19 hr. later the stomachs of surviving animals are excised and examined under 5x magnification. The number of ulcers occurring in the non-secretory portion of each stomach is counted in 4 groups according to size (<2 mm., 2–4 mm., 4–8 mm., and >8 mm.); and each rat receives a score, $z$, which is a weighted average of the logarithms of the ulcer counts in the several size groups determined by a formula found approximately optimal by discriminant function analysis to be $$z = 20.00 \log (N_1+1) + 0.22 \log (N_2+1) + 46.76 \log (N_3+1) + 6.11 \log (N_4+1)$$

where $N_1 \ldots N_4$ are the observed ulcer counts of the increasing size groups. Since long-term studies in approximately 400 animals show that the average $z$ value for controls is 96.2, with a standard error per group of 6 equal to 18.97, a decrease in the average $z$ score for a given test group, relative to concurrent controls, amounting to 37.5 or more is significant ($P \leq 0.05$); and a compound producing such a decrease is considered antiulcerogenic. Results of the testing of the representative products defined by claims 3, 4, 6, and 11 hereinafter via the foregoing procedure are shown in Table I.

TABLE I

| Product | No. of animals | Dose (mg.) | Control score | Cpd. score | Conclusion |
|---|---|---|---|---|---|
| Cl 3 | 6 | 50 | 94.8 | 48.9 | Anti-ulcerogenic. |
| Cl 4 | 5 | 50 | 71.0 | 24.2 | Do. |
| Cl 6 | 6 | 50 | 79.8 | 38.0 | Do. |
| Cl 11 | 6 | 50 | 71.0 | 22.4 | Do. |

The anti-inflammatory activity of the instant compounds is likewise readily demonstrated by standardized tests for this valuable property well-known in the art. See, for example, Winter et al., Proc. Soc. Exper. Biol. and Med., 111, 544 (1962), and various modifications of the technique therein set forth.

It will be recognized that observations of activity in standardized tests for particular pharmacological effects as hereinbefore disclosed are fundamental to the development of valuable new drug products, both veterinary and human.

Preparation of the instant compounds proceeds by heating, in the dark under nitrogen, a dioxan solution of an appropriate dialkyl acetylenedicarboxylate and 2-azido-6-phenylpyrimidine of the formula

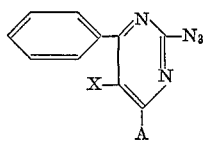

wherein X has the meaning previously assigned and A represents azido or amino. When the embodiment of A is azido, the mixture of 4-azido and 4-[4,5-bis(alkoxycarbonyl)-1H-1,2,3-triazol-1-yl] products hereof which results is separated by chromatography. An alternative preparation of the 4-amino products of this invention wherein the 5-substituent on the pyrimidine nucleus is saturated consists of hydrogenating the corresponding 4-azido compounds in a solvent such as dioxan or tetrahydrofuran, using palladium-on-charcoal as a catalyst. Application of the latter procedure to 4-azido products in which the 5-substituent on the pyrimidine nucleus is unsaturated affords the corresponding 5-alkyl-4-amino products.

The following examples describe in detail compounds illustrative of the present invention and methods which have been devised for their preparation. However, the spirit of the invention is not limited thereby, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

Dimethyl 1 - (4 - azido - 5 - methyl - 6 - phenyl - 2 - pyrimidinyl)-1H-1,2,3-triazole - 4,5 - dicarboxylate and tetramethyl 1,1'-(5-methyl-6-phenyl-2,4 - pyrimidinediyl) bis[1H-1,2,3-triazole-4,5 - dicarboxylate]: A solution of 126 parts of 2,4-diazido-5-methyl-6-phenylpyrimidine and 284 parts of dimethyl acetylenedicarboxylate in 1000 parts of dioxan is heated at the boiling point under reflux in the dark and protected by an atmosphere of nitrogen for 14 hrs., whereupon the dioxan is removed by vacuum distillation. The residue is taken up in benzene; and the benzene solution is chromatographed on silica gel, using benzene and ethyl acetate as developing solvents. From an eluate comprising 10% ethyl acetate in benzene, on evaporation of solvent and recrystallization of the residue from a mixture of dichloromethane and ether, dimethyl 1-(4-azido-5-methyl-6-phenyl - 2 - pyrimidinyl)-1H-1,2,3-triazole-4,5-dicarboxylate melting at approximately 164–165° is obtained. This product has the formula

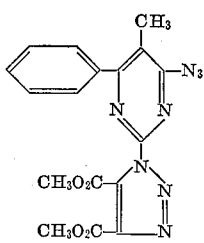

From an eluate comprising 20% ethyl acetate in benzene, on evaporation of solvent and recrystallization of the residue from a mixture of acetone and ether, tetramethyl 1,1'-(5-methyl-6-phenyl - 2,4 - pyrimidinediyl) bis[1H-1,2,3-triazole-4,5 - dicarboxylate] melting at approximately 210–211° is obtained. This product has the formula

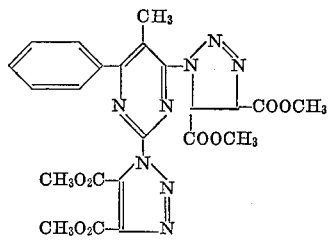

EXAMPLE 2

Dimethyl 1-(4-azido-5-ethyl-6-phenyl-2 - pyrimidinyl)-1H-1,2,3-triazole-4,5-dicarboxylate: A solution of 133 parts of 2,4-diazido-5-ethyl-6-phenylpyrimidine and 284 parts of dimethyl acetylenedicarboxylate in 1000 parts of dioxan is heated at the boiling point under reflux in the dark, protected by an atmosphere of nitrogen, for 14 hours. The dioxan is thereupon removed by vacuum distillation, and the residue is taken up in benzene. The benzene solution is chromatographed on silica gel, using benzene and ethyl acetate as developing solvents. From an eluate comprising 10% ethyl acetate in benzene, on evaporation of solvent, dimethyl 1-(4-azido-5-ethyl-6-phenyl-2-pyrimidinyl) - 1H - 1,2,3 - triazole - 4,5 - dicarboxylate is obtained as the residue. The product has the formula

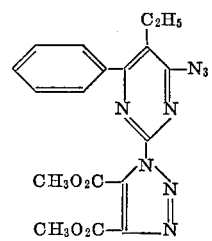

EXAMPLE 3

Dimethyl 1-(4-azido-5-methoxymethyl - 6 - phenyl - 2 - pyrimidinyl - 1H - 1,2,3 - triazole - 4,5 - dicarboxylate: Substitution of 141 parts of 2,4-diazido - 5 - methoxymethyl-6-phenylpyrimidine for the 2,4 - diazido - 5 - ethyl-6-phenylpyrimidine called for in Example 2 affords, by the procedure there detailed, dimethyl 1-(4 - azido - 5-methoxymethyl - 6 - phenyl - 2 - pyrimidinyl) - 1H - 1,2,3-triazole-4,5-dicarboxylate having the formula

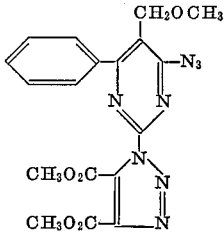

EXAMPLE 4

Dimethyl 1-[4-azido-5-(2-ethoxyethyl)-6 - phenyl - 2 - pyrimidinyl]-1H-1,2,3-triazole - 4,5 - dicarboxylate and tetramethyl 1,1'-[5-(2-ethoxyethyl)-6-phenyl-2,4 - pyrimidinediyl]bis[1H-1,2,3-triazole-4,5-dicarboxylate]: A solution of 11 parts of 2,4-diazido-5-(2-ethoxyethyl) - 6-phenylpyrimidine and 20 parts of dimethyl acetylenedicarboxylate in 90 parts of dioxan is heated at the boiling point under reflux in the dark, protected by an atmosphere of nitrogen, for 18 hours. Dioxan is thereupon removed by vacuum distillation, and the residue is taken up in benzene. The benzene solution is chromatographed on silica gel, using benzene and ethyl acetate as developing solvents. From an eluate comprising 5% ethyl acetate in benzene, on evaporation of solvent and recrystallization of the residue from a mixture of dichloromethane and ether, dimethyl 1-[4-azido-5 - (2 - ethoxyethyl) - 6-phenyl-2-pyrimidinyl]-1H-1,2,3-triazole - 4,5 - dicarboxylate melting at approximately 94–95° is obtained. This product has the formula

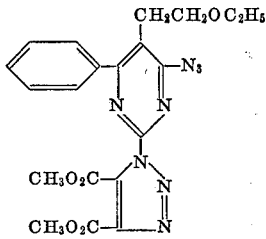

From eluates comprising 20%, 30%, and 40% of ethyl acetate in benzene, upon cooling and removal of solvent by distillation, a residue is obtained which, recrystallized from acetone, affords tetramethyl 1,1'-[5-(2 - ethoxyethyl)-6-phenyl-2,4-pyrimidinediyl]bis[1H - 1,2,3 - triazole-4,5-dicarboxylate] melting at 166–168°. The product has the formula

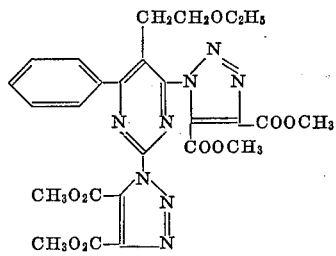

EXAMPLE 5

Dimethyl 1-(5-allyl-4-azido-6-phenyl-2 - pyrimidinyl)-1H-1,2,3-triazole-4,5-dicarboxylate: Substitution of 139 parts of 5-allyl-2,4-diazido-6-phenyl-pyrimidine for the 2,4-diazido-5-ethyl-6-phenylpyrimidine called for in Example 2 affords, by the procedure there detailed, dimethyl 1-(5-allyl-4-azido-6-phenyl-2-pyrimidinyl)-1H - 1,2,3 - triazole-4,5-dicarboxylate, having the formula

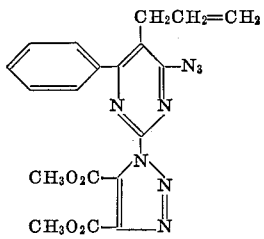

EXAMPLE 6

Dimethyl 1-[4-azido-5-(2-methylallyl) - 6 - phenyl - 2-pyrimidinyl]-1H-1,2,3-triazole - 4,5 - dicarboxylate: Substitution of 146 parts of 2,4-diazido-5-(2-methylally)-6-phenylpyrimidine for the 2,4-diazido-5-ethyl - 6 - phenylpyrimidine called for in Example 2 affords, by the procedure there detailed, dimethyl 1-[4-azido-5-(2 - methylallyl)-6-phenyl-2-pyrimidinyl]-1H-1,2,3-triazole - 4,5 - dicarboxylate, having the formula

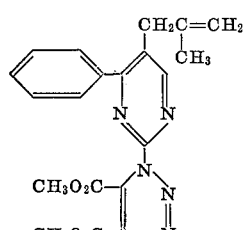

EXAMPLE 7

Dimethyl 1-[4-azido-6-phenyl-5-(2-propynyl)-2-pyrimidinyl]-1H-1,2,3-triazole-4,5-dicarboxylate and tetramethyl 1,1'-[6-phenyl-5-(2 - propynyl) - 2,4 - pyrimidinediyl]bis [1H-1,2,3-triazole-4,5-dicarboxylate]: A solution of 27 parts of 2,4-diazido-6-phenyl-5-(2-propynyl) pyrimidine and 35 parts of dimethyl acetylenedicarboxylate in 200 parts of dioxan is heated at the boiling point under reflux in the dark, protected by an atmosphere of nitrogen, for 12 hours. Dioxan is thereupon removed by vacuum distillation, and the residue is taken up in benzene. The benzene solution is chromatographed on silica gel, using benzene and ethyl acetate as developing solvents. From an eluate comprising 5% ethyl acetate in benzene, on evaporation of solvent and crystallization of the residue from a mixture of dichloromethane and ether, dimethyl 1-[4-azido-6-phenyl-5-(2-propynyl)-2-pyrimidinyl]-1H - 1,2,3-triazole-4,5-dicarboxylate melting at approximately 150–151° is obtained. This product has the formula

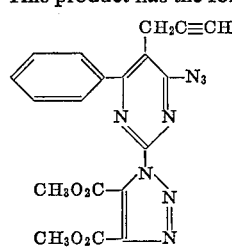

From eluates comprising 15% and 20% of ethyl acetate in benzene, upon cooling and removal of solvent by distillation; a residue is obtained which, crystallized from a mixture of acetone and ether, affords tetramethyl 1,1'-[6-phenyl-5-(2-propynyl) - 2,4 - pyrimidinediyl]bis[1H-1,2,3-triazole-4,5-dicarboxylate] melting at approximately 252–253°. This product has the formula

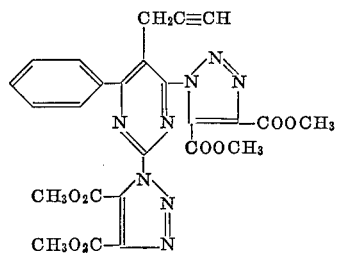

EXAMPLE 8

Dimethyl 1 - [4 - azido - 5 - (2 - butynyl) - 6 - phenyl-2 - pyrimidinyl] - 1H - 1,2,3 - triazole - 4,5 - dicarboxylate and tetramethyl 1,1'-[5-(2-butynyl)-6-phenyl-2,4-pyrimidinediyl]bis[1H-1,2,3-triazole-4,5-dicarboxylate]: A solution of 35 parts of 2,4-diazido-5-(2-butynyl)-6-phenyl-pyrimidine and 51 parts of dimethyl acetylenedicarboxylate in 300 parts of dioxan is heated at the boiling point under reflux in the dark, protected by an atmosphere of nitrogen, for 12 hours. Dioxan is thereupon removed by vacuum distillation and the residue is taken up in benzene. The benzene solution is chromatographed on silica gel, using benzene and ethyl acetate as developing solvents. From an eluate comprising 5% ethyl acetate in benzene, on evaporation of solvent and crystallization of the residue from a mixture of dichloromethane and ether, dimethyl 1-[4-azido-5-(2-butynyl)-6-phenyl-2-pyrimidinyl]-1H-1,2,3-triazole-4,5-dicarboxylate melting at approximately 135–136° is obtained. This product has the formula

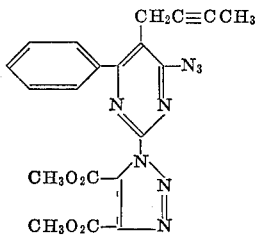

From an eluate comprising 10% ethyl acetate in benzene, on evaporation of solvent and crystallization of the residue from a mixture of acetone and ether, tetramethyl 1,1' - [5 - (2 - butynyl) - 6 - phenyl - 2,4 - pyrimidinediyl] bis[1H-1,2,3-triazole-4,5-dicarboxylate] melting at approximately 167–168° is obtained. This product has the formula

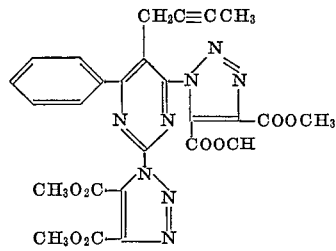

EXAMPLE 9

Dimethyl 1 - (4 - azido - 5 - bromo - 6 - phenyl - 2 - pyrimidinyl)-1H-1,2,3-triazole-4,5-dicarboxylate: A solution of 10 parts of 2,4-diazido-5-bromo-6-phenyl-pyrimidine and 5 parts of dimethyl acetylenedicarboxylate in 50 parts of dioxan is heated at the boiling point under reflux in the dark, protected by an atmosphere of nitrogen, for 12 hours. The dioxan is thereupon removed by vacuum distillation, and the residue is crystallized from acetone to give dimethyl 1-(4-azido-5-bromo-6-phenyl-2-pyrimidinyl)-1H-1,2,3-triazole-4,5-dicarboxylate melting at 166–168°. The product has the formula

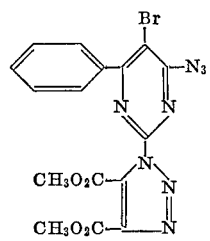

EXAMPLE 10

Dimethyl 1 - (4 - amino - 5 - methyl - 6 - phenyl - 2-pyrimidinyl)-1H-1,2,3-triazole-4,5-dicarboxylate: To a solution of 5 parts of dimethyl 1-(4-azido-5-methyl-6-phenyl-2-pyrimidinyl)-1H-1,2,3-triazole-4,5-dicarboxylate in 100 parts of dioxane is added 1 part of 5% palladium-on-charcoal. The resultant mixture is agitated under 1 atmosphere of hydrogen at room temperatures for 18 hours. Catalyst is thereupon filtered off and the filtrate freed of solvent by vacuum distillation. The residue, upon crystallization from a mixture of dichloromethane and ether, offords dimethyl 1 - (4 - amino - 5 - methyl - 6 - phenyl - 2 - pyrimidinyl)-1H-1,2,3-triazole-4,5-dicarboxylate melting at appproximately 194–195°. The product has the formula

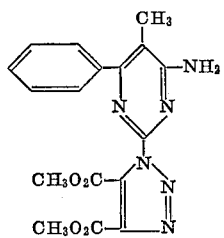

EXAMPLE 11

Dimethyl 1 - (4 - amino - 5 - butyl - 6 - phenyl - 2-pyrimidinyl)-1H-1,2,3-triazole-4,5-dicarbonxylate: Substitution of 5 parts of dimethyl 1-[4-azido-5-(2-butynyl)-6-phenyl - 2 - pyrimidinyl] - 1H - 1,2,3 - triazole - 4,5 - dicarboxylate and 100 parts of tetrahydrofuran for the dimethyl 1 - 4 - azido - 5 - methyl - 6 - phenyl - 2 - pyrimidinyl)-1H-1,2,3-triazole-4,5-dicarboxylate and dioxan, respectively, called for in Example 10 affords, by the procedure there detailed, dimethyl 1-(4-amino-5-butyl-6-phenyl - 2 - pyrimidinyl) - 1H - 1,2,3 - triazole - 4,5 - dicarboxylate melting at approximately 160–161°. The product has the formula

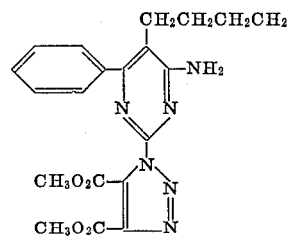

EXAMPLE 12

Dimethyl 1 - [4 - amino - 5 - (2 - ethoxyethyl) - 6-phenyl - 2- pyrimidinyl] - 1H - 1,2,3 - triazole - 4,5 - dicarboxylate: Substitution of 5 parts of dimethyl 1-[4-azido-5 - (2 - ethoxyethyl) - 6 - phenyl - 2 - pyrimidinyl] - 1H-1,2,3-triazole-4,5-dicarboxylate and 100 parts of tetrahydrofuran for the dimethyl 1-(4-azido-5-methyl-6-phenyl-2 - pyrimidinyl) - 1H - 1,2,3 - triazole - 4,5 - dicarboxylate and dioxan, respectively, called for in Example 10 affords, by the procedure there detailed, dimethyl 1-[4-amino-5-(2 - ethoxyethyl) - 6 - phenyl - 2 - pyrimidinyl] - 1H-1,2,3-triazole-4,5-dicarboxylate melting at approximately 128–129°. The product has the formula

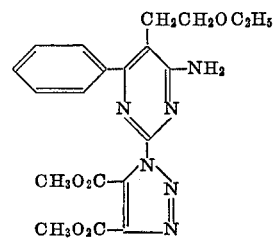

EXAMPLE 13

Dimethyl 1-(4-amino-5-bromo-6-phenyl-2-pyrimidinyl)-1H-1,2,3-triazole-4,5-dicarboxylate: Substitution of five parts of dimethyl 1-(4-azido-5-bromo-6-phenyl-2-pyrimidinyl)-1H-1,2,3-triazole-4,5-dicarboxylate and 200 parts of dioxan for the 5 parts of dimethyl 1-(4-azido-5-methyl-6 - phenyl - 2 - pyrimidinyl) - 1H - 1,2,3 - triazole - 4,5-dicarboxylate and 100 parts of dioxan, respectively, called for in Example 10 affords, by the procedure there detailed, dimethyl 1-(4-amino-5-bromo-6-phenyl-2-pyrimidinyl)-1H-1,2,3-triazole-4,5-dicarboxylate melting at 214–216°. The product has the formula

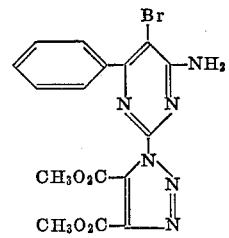

What is claimed is:
1. A compound of the formula

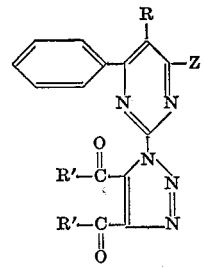

wherein R represents lower alkyl, alkoxyalkyl in which both alkoxy and alkyl are of lower order, alkenyl containing more than 2 and fewer than 5 carbons, alkynyl containing more than 2 and fewer than 5 carbons, or bromine; R' represents lower alkoxy; and Z represents azido, amino, or 4,5-bis(lower alkoxycarbonyl)-1H-1,2,3-triazole-1-yl.

2. A compound according to claim 1 wherein R represents lower alkyl.

3. A compound according to claim 1 which is dimethyl 1 - (4 - azido - 5 - methyl - 6 - phenyl - 2 - pyrimidinyl)-1H-1,2,3-triazole-4,5-dicarboxylate.

4. A compound according to claim 1 which is tetramethyl 1,1' - (5 - methyl - 6 - phenyl - 2,4 - pyrimidinediyl)=bis[H-1,2,3-triazole-4,5-dicarboxylate].

5. A compound according to claim 1 wherein R represents alkoxyalkyl in which both alkoxy and alkyl are of lower order.

6. A compound according to claim 1 which is tetramethyl 1,1' - [5 - (2 - ethoxyethyl) - 6 - phenyl - 2,4-pyrimidinediyl]bis[1H - 1,2,3 - triazole - 4,5 - dicarboxylate].

7. A compound according to claim 1 wherein R represents alkenyl containing more than 2 and fewer than 5 carbons and Z represents 4,5-bis(lower alkoxycarbonyl)-1H-1,2,3-triazol-1-yl.

8. A compound according to claim 1 wherein R represents lower alkynyl containing more than 2 and fewer than 5 carbons.

9. A compound according to claim 1 which is dimethyl 1 - [4 - azido - 5 - (2 - butynyl) - 6 - phenyl - 2 - pyrimidinyl]-1H-1,2,3-triazole-4,5-dicarboxylate.

10. A compound according to claim 1 wherein R represents bromine.

11. A compound according to claim 1 which is dimethyl 1 - (4 - amino - 5 - bromo - 6 - phenyl - 2 - pyrimidinyl)-1H-1,2,3-triazole-4,5-dicarboxylate.

12. A compound according to claim 1 wherein Z represents amino.

References Cited

UNITED STATES PATENTS 3,041,339  6/1962  Sirakawa et al. _____ 260—256.4

ALEX MAZEL, Primary Examiner

R. J. GALLAGHER, Assistant Examiner

U.S. Cl. X.R.

260—251; 424—251

PO-1050
(5/69)

UNITED STATES PATENT OFFICE
CERTIFICATE OF CORRECTION

Patent No. 3,479,357   Dated November 18, 1969

Inventor(s)  Hans A. Wagner

It is certified that error appears in the above-identified patent and that said Letters Patent are hereby corrected as shown below:

Column 4, the first formula 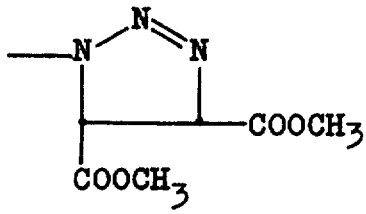

should be 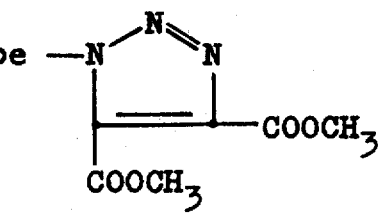   Cf. page 8, formula.

Column 5, the last formula 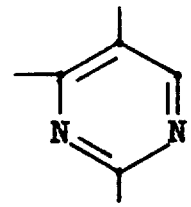 should be 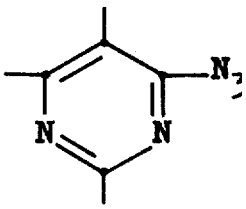

Cf. page 12, formula.

Column 8, the first formula $\underset{\lambda}{CH_2CH_2CH_2CH_2}$ should be $\underset{\lambda}{CH_2CH_2CH_2CH_3}$  Cf. page 17, formula.

SIGNED AND
SEALED
JUN 16 1970

(SEAL)
Attest:

Edward M. Fletcher, Jr.
Attesting Officer

WILLIAM E. SCHUYLER, J
Commissioner of Patent